Patented July 8, 1947

UNITED STATES PATENT OFFICE 2,423,766

CREAMING LATEXES

Richard D. Freeman, Midland, Mich., assignor to The Dow Chemical Company, Midland, Mich., a corporation of Michigan No Drawing. Application February 13, 1941, Serial No. 378,771

5 Claims. (Cl. 260—93)

This invention relates to the concentration and purification, by creaming, of latexes.

It is well known that rubber latex can be creamed by the addition of small quantities of some water-soluble colloids such as ammonium alginate, pectins, extract of carragheen moss, glue, gelatine, gum arabic, gum tragacanth and the like. Creaming effects the separation of the latex into two layers, the upper of which contains the major part of the rubber particles and the other most of the water-soluble constituents of the latex. The upper layer is recovered as a concentrated dispersion of rubber which is, in certain applications, more suitable for use in the arts than is dilute natural latex and is capable of being shipped at lower cost per unit weight of rubber. Another of the well known advantages of the creaming process is that it provides a dispersion of rubber containing only a small portion of the water-soluble impurities originally present in the latex. Such impurities lead to the formation of rubber goods of decreased water resistance and poor electrical properties. However, the creaming agents known hitherto are not entirely satisfactory in this respect; they do not remove all of the natural water-soluble materials, and, being of themselves water-soluble in nature, further increase the amount of water-soluble material remaining with the rubber solids.

Many polymeric substances are synthetically produced by a method known as emulsion polymerization. In such method the polymer product is obtained in a form closely resembling a latex. Such synthetic latexes are commonly more dilute than is desired, and hence it is desirable to be able to effect a thickening action, by creaming, in a manner similar to that employed with natural rubber latex.

It is, accordingly, an object of the present invention to provide a method of creaming latexes which will give concentrated dispersions containing substantially no water-soluble material. A further object is the provision of a creaming agent for latexes which is effective in a very small concentration. Other and related objects will appear hereinafter.

To the accomplishment of the foregoing and related ends, the invention, then, consists of the method hereinafter fully described and particularly pointed out in the claims, the following description setting forth in detail certain modes of carrying out the invention, such disclosed modes illustrating, however, but some of the various ways in which the principle of the invention may be used.

The present invention rests on the observation that ammoniacal aqueous solutions of polyvalent metal salts of high molecular weight linear polymeric carboxyl compounds such as carboxy-alkyl celluloses, alginic acid and polyacrylic acid are extremely efficient creaming agents for rubber latex and for some synthetic latexes, to be defined hereinafter.

The class of creaming agents here concerned are all polyvalent metal salts of compounds having a long carbon chain, which may, as in the case of cellulose and alginic acid, have occasional oxygen linkages, and they all have carboxylic groups dependent from that chain at intervals throughout its length. The exact nature of the high molecular weight linear structure appears to be immaterial, so long as it fits the above description. All these bodies have been found to yield water-insoluble polyvalent metal salts, which swell and dissolve on addition of aqueous solutions of ammonia or other volatile base such as methyl amine, dimethyl amine, tertiary butyl amine, and the like. The solutions thus produced are efficient latex creaming agents and yield creams containing little or no water-soluble materials. The creaming agents themselves are rendered insoluble by removal of the volatile base and are therefore present in water-insoluble form in the rubber or like articles fabricated from the cream. Such fabricated articles possess superior water resistance and high electrical insulating qualities, as compared with those heretofore produced.

While the invention is primarily concerned with the creaming of natural rubber latex, it will be apparent from the examples herein that it is not so-limited. Various synthetic latexes of a rubber-like nature, as for example, a polybutadiene latex, or a polychloroprene latex, or a polydivinyl acetylene latex, all produced and employed in the preparation of imitation or synthetic rubber, may also be treated advantageously according to the invention. For simplicity of description in the general discussion to follow, all such latexes will be designated as "elastomer" latexes, in accordance with the suggestion found in Industrial and Engineering Chemistry, vol. 31, pages 941–945 (1939).

In carrying out the invention, a latex is treated with a small quantity of creaming agent of the aforementioned new type dissolved in an aqueous solution of a volatile alkali, suitably ammonia, and the mixture is allowed to stand while the latex separates into two layers. One layer is the cream, substantially free from water-soluble ingredients, and the other is the serum layer, lean in rubber or elastomer particles. The described salt of any polyvalent metal may be used for creaming but it is desirable not to use a metal having a deleterious effect on the rubber or elastomer contained in the latex being treated. Thus, salts of copper, cobalt, manganese, chromium and vanadium are usually avoided when creaming natural rubber latex, on account of their degrading effect on natural rubber under some conditions of treatment. It is preferred that salts of aluminum be used in carying out the present invention as such salts are colorless, have no ill effect on rubber or other elastomers, and are readily prepared.

The creaming agents of the present invention may be prepared readily by adding an aqueous solution of an inorganic aluminum salt to an aqueous solution of a water-soluble salt of a linear polymeric carboxyl compound of the class described. The precipitate of aluminum salt thus formed is separated and preferably washed until free from water-soluble salts. The product may be dried for storage or may be dissolved immediately in an aqueous solution of a volatile base to provide a solution suitable for creaming according to the invention. Alginic acid, which is known alternatively as polymannuronic acid, is obtained in the form of its sodium salt from marine kelp by digestion with aqueous solutions of sodium carbonate. Sodium polyacrylate may be made from polymeric ethyl acrylate, or other polymerized ester of acrylic acid, through saponification. Water-soluble salts of the carboxy alkyl celluloses may be prepared in the ways well known to the art, through the reaction of monochloro fatty acids with alkali cellulose. Water-soluble derivatives of several of the aforementioned compounds are articles of commerce. Thus, alginic acid is sold under the name "Algin"; sodium alginate is sold under the names "Kelgin" and "Daroloid," and sodium polyacrylate may be purchased under the name "Rhotex A20." Finally, cellulose glycollic acid is on the market in the form of both its sodium and aluminum salts.

Creaming action is observed when using ammoniacal solutions of polyvalent metal salts of the designated polymeric carboxyl compounds in amounts as small as 0.2 per cent of the weight of elastomer or rubber in the latex being creamed. When using such a small quantity, the time necessary for an amount of useful creaming to take place is several days. The creaming action is hastened by the use of larger amounts of agent up to 2 per cent of the weight of the elastomer or rubber present. Larger amounts than this have a stabilizing effect on many rubber latexes, which defeats creaming action.

Of the creaming agents available for use in the present invention it is preferred to use aluminum cellulose glycollate, which is soluble in dilute ammonia to form solutions which are most efficient creaming agents. Satisfactory creaming is attained by the use of from 0.2 to 1 part of aluminum cellulose glycollate per 100 parts of latex elastomer or rubber solids, but for the maximum elimination of water-soluble materials from the latex, most complete recovery of elastomer or rubber, and the production of the most concentrated creams, the amount of aluminum cellulose glycollate preferably should be limited between 0.45 and 0.75 part per 100 parts of elastomer or rubber solids.

As illustrative of the invention, the following examples are given:

EXAMPLE 1

A comparison of the creaming power of a number of known creaming agents with that of aluminum cellulose glycollate was made. The latex used was an ammonia preserved, natural rubber latex containing 38.4 per cent rubber. To several quantities of this latex each containing 100 grams of rubber, 200 grams each of solutions of a number of creaming agents were added. The concentration of each of the solutions of the creaming agents was 0.25 per cent, so that the total ratio of weight of creaming agent to the weight of rubber in the latex was 0.5 per cent in every case. The mixtures were allowed to stand for 48 hours in separatory funnels and the separated serum drawn off at the end of this time. The concentrated creams remaining in the funnels were analysed with the results shown in Table 1 below.

Table 1

| Creaming Agent | Analysis of Cream | | | Original Rubber in Cream Layer after 48 hrs., Per cent |
| --- | --- | --- | --- | --- |
| | Total Solids Content, Per cent | Dry Rubber Content, Per cent | Water Soluble, Per cent | |
| None | 38.4 | 34.7 | 3.7 | |
| Sodium Cellulose Glycollate | 54.4 | 54.2 | 0.20 | 84.0 |
| Methyl Cellulose | 56.4 | 55.0 | 1.4 | 52.7 |
| Sodium Alginate | 52.0 | 51.4 | 0.6 | 47.4 |
| Gum Karaya | 11.9 | 9.8 | 2.1 | 8.1 |
| Aluminum Cellulose Glycollate | 52.3 | 52.3 | 0.0 | 95.3 |

It will be noted that the use of aluminum cellulose glycollate gives a cream of solids content equivalent to that produced by the best of the older creaming agents tried and that it is superior to all the others in that the whole of this solids content consists of water-insoluble material. Further, the proportion of rubber remaining in the serum is small, as 95.3 per cent of the rubber contained in the latex is recovered in the cream.

EXAMPLE 2

Optimum quantities of aluminum cellulose glycollate for use in creaming were determined by carrying out a series of experiments similar to those described in Example 1 using amounts of aluminum cellulose glycollate between 0.1 and 2 parts per 100 parts by weight of rubber. In each case 200 parts by weight of ammoniacal solution of creaming agent was added to 257 parts by weight of rubber latex. The results obtained are summarized in Table 2, in which the reported tests had a duration of 48 hours. It is observed that the best results were obtained when between about 0.45 and 0.75 part by weight of creaming agent are used, consideration being given both to water-soluble residue and to cream concentration.

Table 2

| Amount of Aluminum Cellulose Glycollate per 100 parts Rubber | Analysis of Cream | | | Rubber Recovered, Per cent |
| --- | --- | --- | --- | --- |
| | Total Solids Content, Per cent | Dry Rubber Content, Per cent | Water-Soluble, Per cent | |
| 0.1 | (no creaming) | | | |
| 0.25 | 51.4 | 49.9 | 1.5 | 71.3 |
| 0.49 | 52.3 | 52.3 | 0.0 | 95.3 |
| 0.73 | 49.4 | 49.4 | 0.0 | 95.5 |
| 0.97 | 40.7 | 39.8 | 0.9 | 100.0 |
| 1.5 | 25.3 | 23.1 | 2.2 | 96.2 |
| 1.94 | 25.1 | 21.8 | 3.3 | 92.6 |

EXAMPLE 3

In a manner similar to that employed in the preceding example, ammoniacal solutions of aluminum cellulose glycollate were employed to cream emulsions of a butadiene polymer. The original latex subjected to treatment had a solids content of 23.9 per cent. The results are given in Table 3.

Table 3

| Amount of Aluminum Cellulose Glycollate per 100 parts Butadiene Solids | Total Solids in— | | Original Butadiene Recovered in Cream, Per Cent |
|---|---|---|---|
| | Serum | Cream | |
| 0.1 | no creaming in 48 hours | | |
| 0.25 | no creaming in 48 hours | | |
| 0.5 | 3.28 | 38.8 | 77.0 |
| 0.75 | 1.14 | 40.0 | 92.0 |
| 1.0 | 0.92 | 30.7 | 97.5 |

Other elastomer latexes of synthetic origin, including those of the various "Buna" types and "neoprene", were treated in like manner with ammoniacal aluminum cellulose glycollate solutions, or with ammoniacal solutions of copper, cobalt, manganese, chromium, or iron salts of cellulose glycollic acid, or of alginic acid, or of polyacrylic acid, and in each case the added agent caused creaming of the elastomer latex when used in amounts of from 0.45 to 2 per cent, based on the weight of elastomer present, and allowed to stand for from 2 to 20 days. The preferred creaming agent in each case was found to be aluminum cellulose glycollate.

The tests above-described extended only over a period of 48 hours. Current commercial rubber creaming practice prescribes much longer periods of time, of the order of 4 to 20 days. The new creaming agents are effective in amounts of about 0.2 to 2.0 per cent over such periods. Hence, the broad limits of the amount of new creaming agent to be used with rubber are about 0.2 to 2 per cent, and the preferred amounts are about 0.45 to 0.75 per cent, based on the weight of rubber solids.

The invention has been particularly described with respect to the creaming of an elastomer or rubber latex on standing. The aluminum and other polyvalent metal salts of linear polymeric carboxy compounds of the designated class are equally applicable for facilitating the creaming of latexes according to the centrifugal process. That is, addition of a relatively small amount of the creaming agent accelerates the separation of cream both when the latex is allowed to stand under the influence of gravity and when centrifugal force is applied to it. In both cases, the cream obtained is a concentrated emulsion containing a higher proportion of elastomer or rubber than the original latex and is substantially free from water-soluble matter.

I claim:
1. A method of creaming a substance selected from the group consisting of natural rubber latex and synthetic rubber emulsions, which comprises adding thereto a dilute aqueous volatile alkali solution of a water-insoluble polyvalent metal salt of a linear polymeric carboxyl compound selected from the group consisting of carboxy-alkyl celluloses, alginic acid and polyacrylic acid, such polymeric carboxyl compound being in amount not exceeding 2 per cent of the weight of water-insoluble solids in the emulsion, thereby causing the latter to be resolved into an aqueous serum and a cream having a high concentration of water-insoluble solids, and separating the cream from the serum.

2. A method of creaming a substance selected from the group consisting of natural rubber latex and synthetic rubber emulsions, which comprises adding thereto a dilute aqueous ammoniacal solution of a water-insoluble polyvalent metal salt of a linear polymeric carboxyl compound selected from the group consisting of carboxy-alkyl celluloses, alginic acid and polyacrylic acid, such polymeric carboxyl compound being in amount not exceeding 2 per cent of the weight of water-insoluble solids in the emulsion, thereby causing the latter to be resolved into an aqueous serum and a cream having a high concentration of water-insoluble solids, and separating the cream from the serum.

3. A method of creaming a substance selected from the group consisting of natural rubber latex and synthetic rubber emulsions, which comprises adding thereto a dilute aqueous ammoniacal solution of aluminum cellulose glycollate, such glycollate being in amount not exceeding 2 per cent of the weight of water-insoluble solids in the emulsion, thereby causing the latter to be resolved into an aqueous serum and a cream having a high concentration of water-insoluble solids, and separating the cream from the serum.

4. Method according to claim 3 in which natural rubber latex is treated.

5. Method according to claim 3 in which a synthetic rubber emulsion is treated.

RICHARD D. FREEMAN.

REFERENCES CITED

The following references are of record in the file of this patent:

UNITED STATES PATENTS

| Number | Name | Date |
|---|---|---|
| 1,740,994 | McGavack | Dec. 24, 1929 |
| 2,013,651 | Erdahl | Sept. 10, 1935 |

OTHER REFERENCES

Carothers, W. H. Carothers Collected Papers (1940), (pages 391–392).
Ind. Eng. Chem., vol. 26, pages 30–34 (1934).
Carothers, Ind. and Eng. Chem., vol. 26, Jan. 1934, pp. 30 and 31.
Fisher, Ind. and Eng. Chem., vol. 31, Aug. 1939, pp. 941–945.
Schade, J. of Aeronautical Sciences, vol. 8, page 177, Mar. 1941.
Barron, Rubber Age (London), April 1941, page 37.